(12) United States Patent
Guttrich et al.

(10) Patent No.: US 11,509,010 B2
(45) Date of Patent: Nov. 22, 2022

(54) ROTATABLE TERMINAL PLATE HOUSING ASSEMBLIES AND METHODS THEREOF

(71) Applicant: Toyota Motor Engineering & Manufacturing North America, Inc., Plano, TX (US)

(72) Inventors: Jordan S. Guttrich, Commerce Township, MI (US); Brian Schneidewind, Ann Arbor, MI (US); Douglas A. Siewert, Ann Arbor, MI (US); Lincoln Morfin, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 303 days.

(21) Appl. No.: 16/778,720

(22) Filed: Jan. 31, 2020

(65) Prior Publication Data
US 2021/0242439 A1    Aug. 5, 2021

(51) Int. Cl.
*H01M 50/20* (2021.01)
*H01M 50/543* (2021.01)
*H01M 50/148* (2021.01)
*B60L 53/80* (2019.01)

(52) U.S. Cl.
CPC ........... *H01M 50/148* (2021.01); *B60L 53/80* (2019.02); *H01M 50/20* (2021.01); *H01M 50/543* (2021.01); *H01M 2220/20* (2013.01)

(58) Field of Classification Search
CPC .. H01M 50/148; H01M 50/543; H01M 50/20; H01M 2220/20; B60L 53/80
See application file for complete search history.

(56) References Cited

U.S. PATENT DOCUMENTS

| 5,576,516 | A | * | 11/1996 | Kameyama | ......... | H01R 11/284 |
|---|---|---|---|---|---|---|
| | | | | | | 439/522 |
| 9,431,811 | B2 | | 8/2016 | Takishita et al. | | |
| 9,780,351 | B2 | | 10/2017 | Shimoda et al. | | |
| 10,038,175 | B2 | | 7/2018 | Liu et al. | | |
| 2015/0111073 | A1 | | 4/2015 | Deriha et al. | | |
| 2017/0179458 | A1 | | 6/2017 | Sato et al. | | |

(Continued)

FOREIGN PATENT DOCUMENTS

| JP | 2012084319 A | 4/2012 |
|---|---|---|
| JP | 6441265 B2 | 12/2018 |
| WO | 2015093564 A1 | 6/2015 |

*Primary Examiner* — Christopher P Domone
*Assistant Examiner* — Kimberly Wyluda
(74) *Attorney, Agent, or Firm* — Dinsmore & Shohl LLP

(57) ABSTRACT

Embodiments described herein generally relate to a battery pack assembly. The battery pack assembly includes a plurality of housing segments and a plurality of battery cells. The plurality of housing segments are coupled to one another. Each one of the plurality of housing segments includes a terminal receiving portion. The terminal receiving portion has a pair of end walls, a pair of side walls and a floor. A terminal connector is positioned within the terminal receiving portion. The terminal connector has a pair of openings. Each battery cell of the plurality of battery cells has a terminal side. A pair of terminals are positioned on the terminal side of each of the plurality of battery cells. Each one of the plurality of housing segments are configured to be rotated with respect to an adjacent housing segment between a use position and a maintenance position.

18 Claims, 11 Drawing Sheets

(56) References Cited

U.S. PATENT DOCUMENTS

| | | |
|---|---|---|
| 2018/0342717 A1 | 11/2018 | Shoji et al. |
| 2019/0027733 A1 | 1/2019 | Hashimoto |
| 2019/0074147 A1 | 3/2019 | Reichert et al. |
| 2022/0131236 A1* | 4/2022 | Kita .................... H01M 50/503 |

* cited by examiner

ROTATABLE TERMINAL PLATE HOUSING ASSEMBLIES AND METHODS THEREOF

TECHNICAL FIELD

The present specification generally relates to a vehicle battery pack and, more specifically, to the vehicle battery cells and removal features thereof.

BACKGROUND

Hybrid electric vehicles include battery packs that further include a stack of battery cells and a bus bar module provided on top of the stack of battery cells. The bus bar module is generally configured to carry a voltage and current to a component of the vehicle (e.g., a powertrain component of the vehicle). Each of the plurality of cells includes a pair of externally threaded terminals. The bus bar module includes a plurality of housings that each include a terminal plate for connecting to the terminals of the cells and a bus bar. The terminal plates of the bus bar module are secured to the externally threaded terminals of the plurality of cells by nuts. As such, the bus bar module extends the entire length of the battery pack. To gain access to the individual battery cell, all of the nuts along the length of the bus bar module must be removed in order to remove the bus bar module.

Accordingly, a need exists for a device that provides for simplifying the removal of at least one battery cell of a plurality of battery cells to reduce the time and effort required to replace at least the one individual battery cell.

SUMMARY

In one embodiment, a battery pack assembly is provided. The battery pack assembly includes a plurality of housing segments and a plurality of battery cells. The plurality of housing segments are coupled to one another. Each one of the plurality of housing segments includes a terminal receiving portion and a terminal connector. The terminal receiving portion has a pair of end walls, a pair of side walls and a floor. The terminal connector is positioned within the terminal receiving portion and includes a pair of openings. Each battery cell of the plurality of battery cells has a pair of terminals. Each one of the plurality of housing segments are configured to be rotated with respect to an adjacent housing segment between a use position and a maintenance position thereby permitting access to at least one battery cell of the plurality of battery cells.

In another embodiment, a battery pack assembly is provided. The battery pack assembly includes a plurality of housing segments. Each one of the plurality of housing segments includes a terminal receiving portion and a tube portion. The tube portion includes a first half and a second half hingedly attached to the first half. The second half moves between a closed position and an open position. The first half is coupled to the terminal receiving portion. The first and second halves each include a tube attachment portion that is received with a tube retainer portion of an adjacent housing segment. The housing segment is coupled to the adjacent housing segment of the plurality of housing segments when the tube attachment portion of the housing segment is received in the tube retainer portion of the adjacent housing segment and the second half of the tube portion is in the closed position.

In yet another embodiment, a method of removing a battery cell from a battery pack assembly is provided. The method includes identifying the battery cell of a plurality of battery cells to be removed from the battery pack assembly, removing at least one fastener from each corresponding pair of terminals of the identified battery cell and the adjacent battery cell of the plurality of battery cells, moving an individual housing segment of a plurality of housing segments corresponding to the identified battery cell of the plurality of housing segments from a use position to a maintenance position and removing the identified battery cell from the battery pack assembly.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
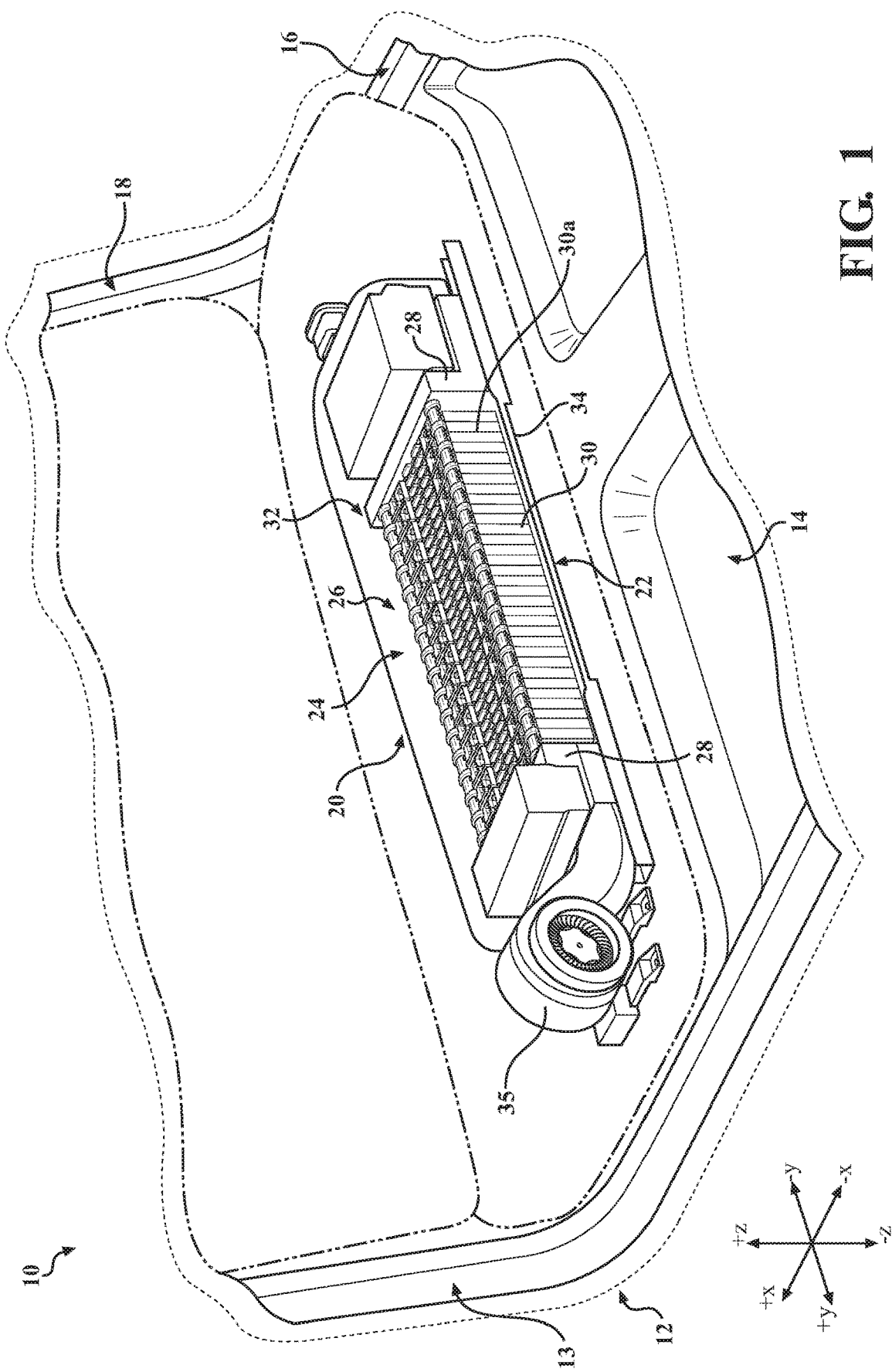
FIG. 1 schematically depicts a partial view of a vehicle and a battery pack assembly, according to one or more embodiments shown or described herein.

Embodiments described herein generally relate to a battery pack assembly. The battery pack assembly includes a plurality of battery cells and a plurality of housing segments. Each one of the plurality of housing segments are coupled to one another. Each one of the plurality of housing segments include a terminal plate housing and a terminal connector. The terminal plate housing has a pair of end walls, a pair of sidewalls and a floor. Each one of the plurality of terminal plate housings are configured to be rotated with respect to an adjacent terminal plate housing between a use position and a maintenance position.

In some embodiments, each one of the plurality of housing segments further includes a receiving portion that has a cover portion hingedly attached to the receiving portion to move between an open position and a closed position. Each cover includes a clip and each receiving portion includes a corresponding clip receiver such that the clip is received in the clip receiver in the closed position. In other embodiments, each one of the plurality of housing segments further includes a tube portion. The tube portion has a first half and a second half hingedly attached to the first half such that the second half moves between a closed position and an open position. The first half is coupled to the terminal plate housing. The second half includes a tube attachment that engages with a tube retainer to form a cylindrical portion of the tube when the second half in the closed position.

The first half and the second half of the tube portion each include a clip at a first end and a clip receiver at an opposite second end. The adjacent terminal plate housing segments of the plurality of housing segments are coupled together when the clip of the adjacent housing segment is received by the clip receiver of the housing segment of the plurality of housing segments. In the maintenance position, the clip of the adjacent housing segment is released from the clip receiver of the housing segment of the plurality of housing segments such that the housing segment of the plurality of housing segments is individually moved from the use position to the maintenance position.

The terminal connector is positioned within the terminal plate housing. The terminal connector has a pair of openings. Each battery cell of the plurality of battery cells has a terminal side. A pair of terminals are positioned on the terminal side of each one of the plurality of battery cells. In the use position, the plurality of terminals are received by the pair of openings of the terminal openings such that the pair of terminals are communicatively coupled to the terminal connector of the terminal plate housing in the use position. In the maintenance position, the plurality of terminals are disconnected from the terminal connector of the terminal plate housing such that a corresponding battery cell of the plurality of battery cells is removed from the battery pack.

As used herein, the term "communicatively coupled" means that coupled components are capable of exchanging electrical signals with one another via a conductive medium or a non-conductive medium, and the like.

As used herein, the term "longitudinal direction" refers to the forward-rearward direction of the battery pack assembly (i.e., in the +/−Y-direction depicted in FIG. 1). The term "lateral direction" refers to the cross-battery pack assembly direction (i.e., in the +/−X-direction depicted in FIG. 1), and is transverse to the longitudinal direction. The term "vertical direction" or "up" or "above" refer to the upward-downward direction of the battery pack assembly (i.e., in the +/−Z-direction depicted in FIG. 1).

Vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein. Further, the vehicle may be a hybrid vehicle, an electric vehicle, a conventional vehicle, and the like.

Referring to FIG. 1, a vehicle 10 including a passenger compartment 12 is shown. The passenger compartment 12 includes a seat 13 and a seat frame 14. The seat frame 14 incudes a seat portion 16 and a seat back portion 18. A battery pack assembly 20 is positioned within the seat portion 16 of the seat frame 14. It should be appreciated that the battery pack assembly 20 may be positioned anywhere within the passenger compartment 12, an engine compartment, and the like, within the vehicle 10.

The battery pack assembly 20 includes a housing 22 that houses a plurality of battery cells 24 and a plurality of housing segments 26 that retain the plurality of battery cells 24 within the housing 22. It should be appreciated that the plurality of battery cells 24 are illustrated as being in a single row in the lateral direction (i.e. in the +/−Y direction), this is non-limiting and the plurality of battery cells 24 may be positioned within the housing 22 in a plurality of configurations and arrangements. For instance, the plurality of battery cells 24 may be positioned within the housing 22 in a column configuration, or in the longitudinal direction (i.e., in the +/−Y direction).

The housing 22 includes a pair of end retaining walls 28 and a pair of side retaining walls 30 that define a housing interior portion 32 that includes a floor 34. In some embodiments, the end retaining walls 28 and the side retaining walls 30 each extend in a system vertical direction (i.e., in the +/−Z direction). Further, in some embodiments, the end retaining walls 28 each extend in a system vertical direction (i.e., in the +/−Z direction) a greater distance than the side retaining walls 30. The side retaining walls 30 further include an outer surface 30a that is positioned outside of each of the plurality of battery cells 24 positioned within the housing interior portion 32 of the housing 22.

The battery pack assembly 20 further includes a cooling mechanism 35. The cooling mechanism 35 forces airflow above and/or beneath each battery cell 24a of the plurality of battery cells 24 to cool the plurality of battery cells 24.

Figure 9:
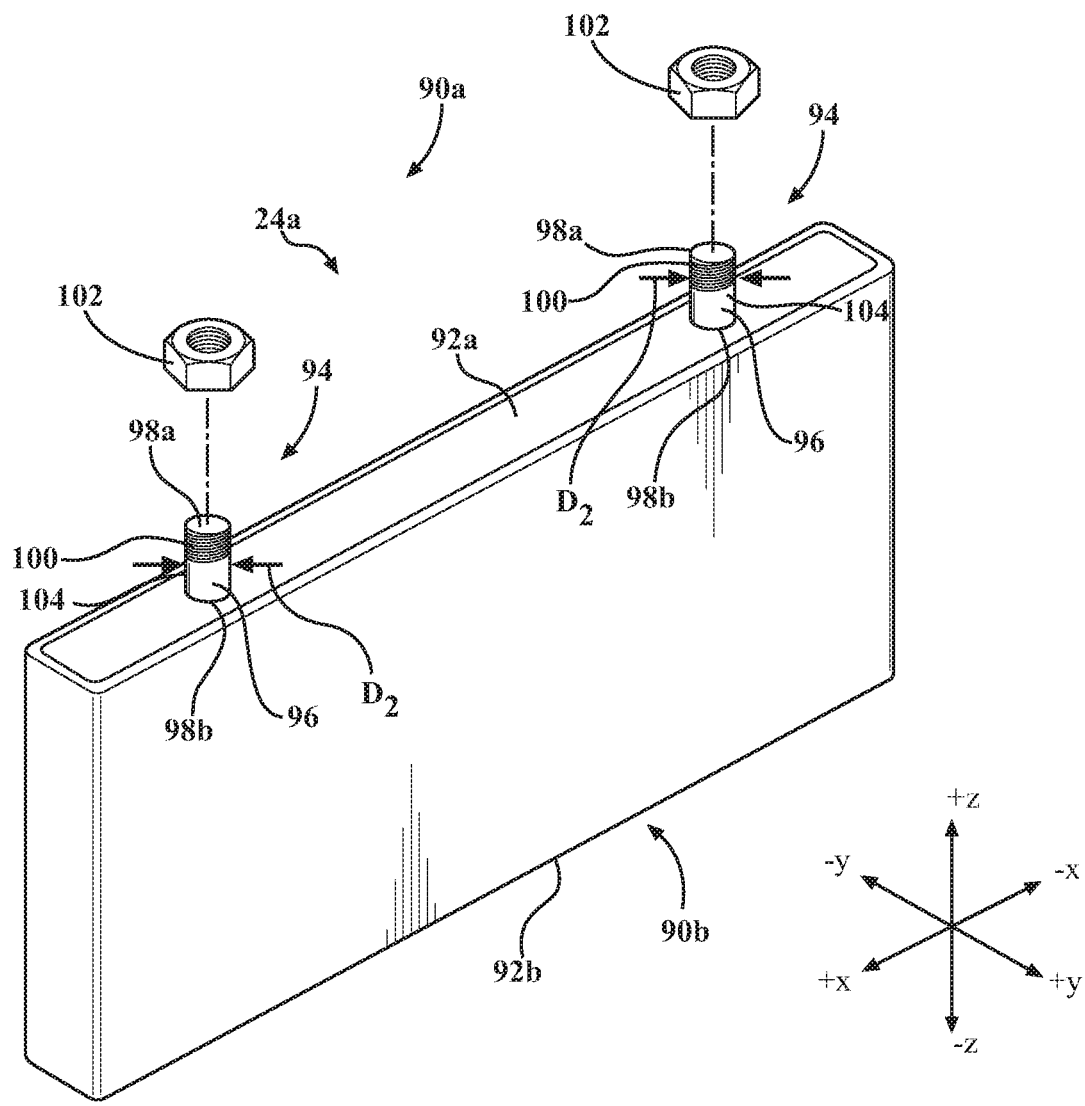
FIG. 9 schematically depicts an isolated perspective view of a battery cell of the battery pack assembly of FIG. 1, according to one or more embodiments described herein.

Referring to FIGS. 1 and 9, it should be understood that while only a battery cell 24a of the plurality of battery cells 24 is described, the features apply to each battery cell of the plurality of battery cells 24. Each battery cell 24a of the plurality of battery cells 24 include a terminal side 90a and an opposite housing side 90b. Further, the battery cell 24a includes a terminal surface 92a on the terminal side 90a and a housing surface 92b that, in some embodiments, abuts the floor 34 of the housing 22. In other embodiments, the housing surface 92b is adjacent to the floor 34 of the housing 22. As such, in this embodiment, the battery cell 24a may not be in contact with the floor 34 of the housing 22. In other embodiments, portions of the housing surface 92b are in contact with portions of the floor 34 of the housing 22.

In some embodiments, a pair of terminals 94 extend from the terminal surface 92a of the battery cell 24a into the terminal side 90a. One of the pair of terminals 94 is generally known as a positive terminal and the other terminal of the pair of terminals 94 is generally known as a negative terminal. Each of the pair of terminals 94 includes a post 96 that extends upwardly from the terminal surface 92a of the battery cell 24a in the vertical direction (i.e., in the +/−Z direction). The post 96 includes a distal end 98a and a proximate end 98b. The proximate end 98b is communicatively coupled to the terminal surface 92a of the battery cell 24a. It should be understood that the portions of the terminal surface 92a that is communicatively coupled to the proximate end 98b of the pair of terminals 94 is indirectly communicatively coupled to internal components of the battery cell 24a and/or the proximate end 98b is directly communicatively coupled to internal components of the battery cell 24a such that the battery cell 24a may be charged and/or discharged via the pair of terminals 94. The distal end 98a is provided with an externally threaded portion 100. The distal end 98a receives a fastener 102 such as a nut, a washer, and the like. Each of the posts 96 includes a terminal connector engagement portion 104 positioned between the distal and proximate ends 98a, 98b. In some embodiments, the distal end 98a and the terminal connector engagement portion 104 has a diameter D2. As such, it should be appreciated that the terminal connector engagement portion 104 of the posts 96 may be a uniform shape or an irregular shape.

Further, in some embodiments, each terminal connector engagement portion 104 of the pair of terminals 94 extend an equal length from the terminal surface 92a in the vertical direction (i.e., in the +/−Z direction) into the terminal side 90a of the battery cell 24a. In other embodiments, the terminal connector engagement portion 104 of one terminal of the pair of terminals 94 extends from the terminal surface 92a in the vertical direction (i.e., in the +/−Z direction) a different height than the terminal connector engagement portion 104 of the other terminal of the pair of terminals 94. For example, in some embodiments, each negative terminal may extend at a height greater than the positive terminal in the vertical direction (i.e., in the +/−Z direction). In other embodiments, each positive terminal may extend at a height greater than the negative terminal in the vertical direction (i.e., in the +/−Z direction).

Still referring to FIGS. 1 and 9, each battery cell 24a of the plurality of battery cells 24 are communicatively coupled in series. That is, it should be understood that in each battery cell 24a of the plurality of battery cells 24 in the row is communicatively coupled to each other and/or to other rows, other columns, and the like, such that each battery cell 24a of the plurality of battery cells 24 are communicatively coupled in series. As such, adjacent battery cells 24b, 24c of the plurality of battery cells 24 is positioned or arranged such that the polarity of the adjacent battery cells 24b, 24c are reversed compared to the adjacent battery cell 24b. That is, in one example, the battery cell 24a is arranged within the housing 22 with a positive terminal nearest to an outer surface 30a of a pair of side retaining walls 30 of the housing 22 while a negative terminal is nearest to a housing interior portion 32 of the housing 22, as discussed in greater detail herein. The adjacent battery cells 24b, 24c are each arranged within the housing 22 with a positive terminal nearest to the housing interior portion 32 of the housing 22 while a negative terminal is nearest to the outer surface 28a of the side retaining walls 30 of the housing 22. As such, it is understood that the positive terminal of each of the plurality of battery cells 24 alternates such that every other battery cell has the same positive terminal polarity arrangement and the same applies for each negative terminal of the plurality of battery cells 24.

The size and shape of the battery cell 24a may depend on predetermined specifics such as the amount of energy to be stored, a temperature response of the battery cell, an amount of energy the vehicle requires, and the like. As such, the type of the battery cell 24a may vary. In some embodiments, the battery cell 24a is lithium ion (LI-Ion). In other embodiments, the battery cell 24a is a Molten Salt (Na—NiCl2), a Nickel Metal Hydride (Ni-MH), a Lithium Sulphur (Li—S), and the like.

Still referring to FIGS. 1 and 9, in some embodiments, portions of the battery cell 24a of the plurality of battery cells 24 may extend at a height greater than the other portions of the battery cell 24a of the plurality of battery cells 24 in the vertical direction (i.e., in the +/−Z direction). For instance, one row of terminals 94 of the plurality of battery cells 24 may be at a height greater than the other row of terminals 94 of the plurality of battery cells 24 in other rows in the vertical direction (i.e., in the +/−Z direction). In other embodiments, some battery cells of the plurality of battery cells 24 within a row in the lateral direction (i.e., in the +/−Y direction) may also be at a height greater than the other battery cells in the same row in the vertical direction (i.e., in the +/−Z direction). For instance, every other battery cell may be at a height greater than the adjacent battery cell in the vertical direction (i.e., in the +/−Z direction). It should be understood that the above are non-limiting examples and that each battery cell of the plurality of battery cells may be in any position in any direction, such as angled, in varying heights, and the like.

Figure 2:
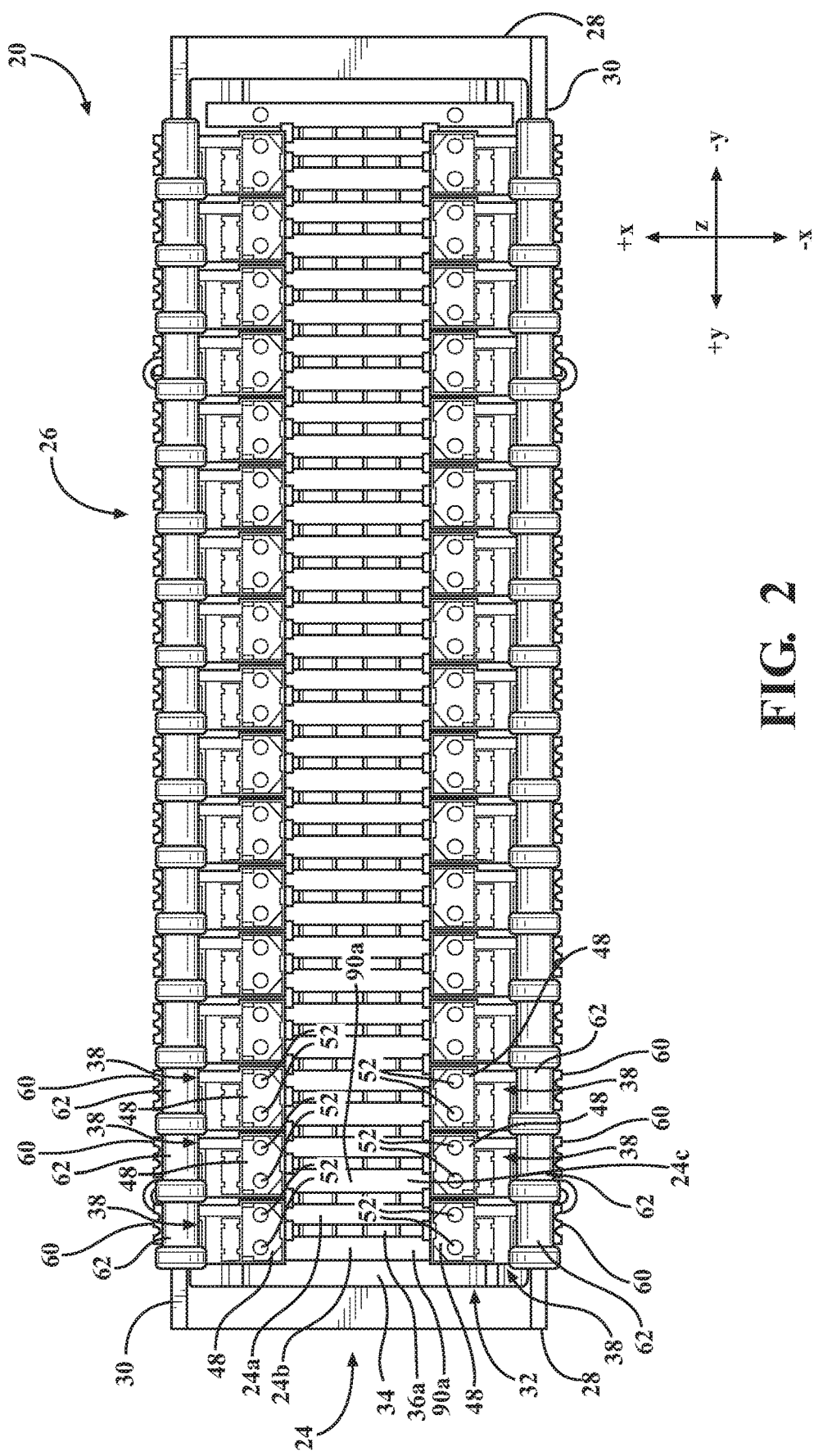
FIG. 2 schematically depicts a top view of the battery pack assembly of FIG. 1 with a plurality of housing segments in a use position, according to one or more embodiments shown or described herein.
Figure 3:
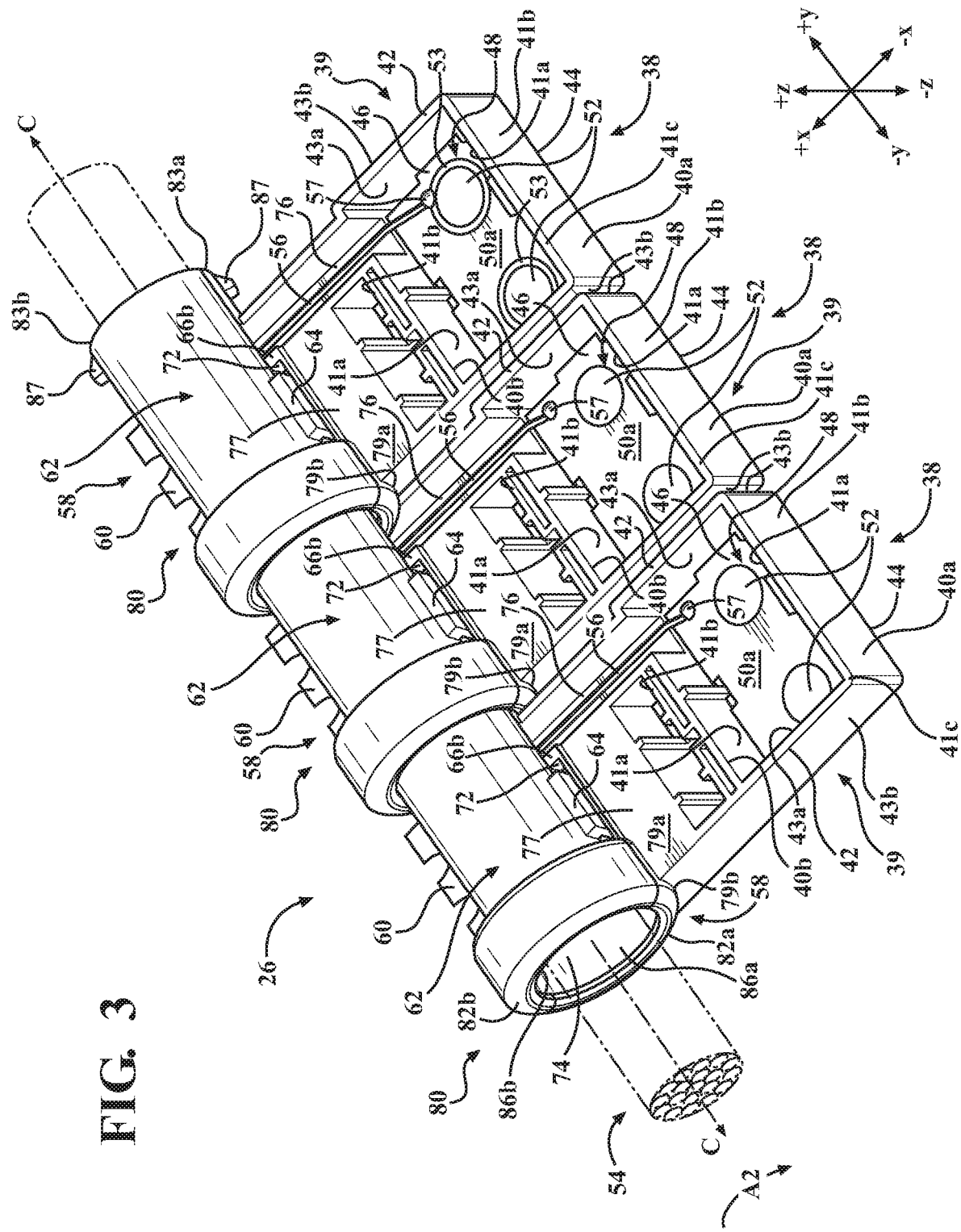
FIG. 3 schematically depicts a partial isolated perspective view of a plurality of housing segments of the battery pack assembly of FIG. 1 in a closed position, according to one or more embodiments shown or described herein.
Figure 4:
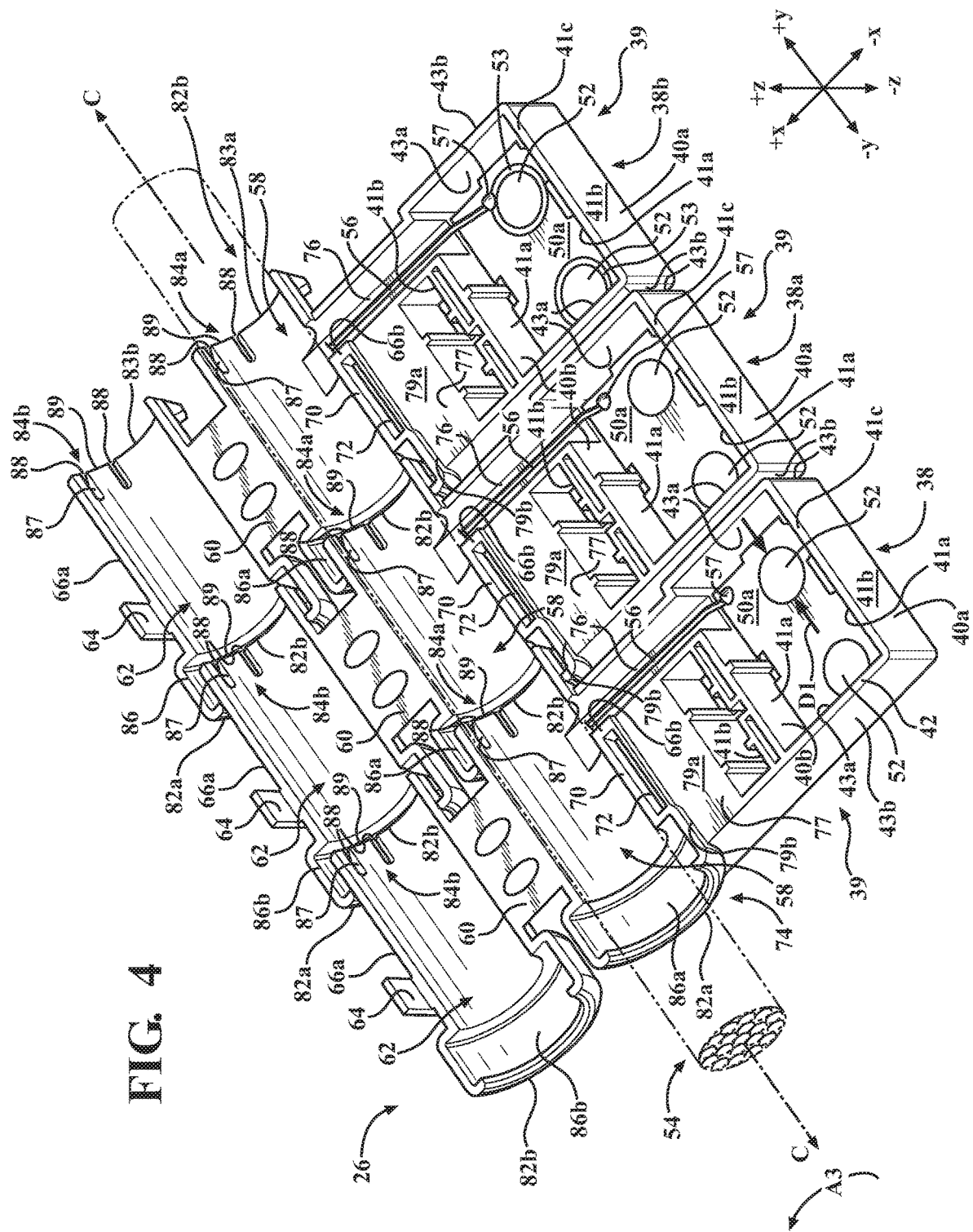
FIG. 4 schematically depicts a partial isolated perspective view of a plurality of housing segments of the battery pack assembly of FIG. 1 in an open position, according to one or more embodiments shown or described herein.

Referring to FIGS. 2-4, the plurality of housing segments 26 extend across the terminal side 90a of the plurality of battery cells 24. Each housing segment 38 of the plurality of housing segments 26 of the battery pack assembly 20 includes a terminal receiving portion 39 and a wire receiving portion 58. The terminal receiving portion 39 includes a pair of end walls 40a, 40b, a pair of sidewalls 42 and a floor 44 that define a cavity 46. In some embodiments, the end walls 40a, 40b and the sidewalls 42 each extend in a system vertical direction (i.e., in the +/−Z direction). Further, in some embodiments, the end walls 40a, 40b and the sidewalls 42 each extend in the vertical direction (i.e., in the +/−Z direction) a same distance. In other embodiments, the end walls 40a, 40b each extend in the vertical direction (i.e., in the +/−Z direction) a greater distance than the sidewalls 42, and/or vice versa. Each of the end walls 40a, 40b include an interior surface 41a, an opposite exterior surface 41b, and an upper surface 41c. The sidewalls 42 further include an inner surface 43a and an exterior surface 43b.

A spacer portion 77 having an upper surface 79a that extends from the exterior surface 41b of the end wall 40b and is positioned between the wire receiving portion 58 and the cavity 46. The spacer portion 77 includes a terminating surface 79b that abuts and/or defines where the spacer portion 77 terminates and the wire receiving portion 58 begins. In some embodiments, the spacer portion 77 is a monolithic structure of the housing segment 38. In other embodiments, the spacer portion 77 is coupled to the housing segment 38 via a fastener, such as a screw, rivet, nut and bolt, and the like, by an adhesive, by welding, and the like. A wire channel 76 is positioned to couple the cavity 46 to the wire receiving portion 58. In some embodiments, the wire channel 76 is positioned along the inner surface 43a of one of the sidewalls 42, extending through a portion of one of the end walls 40b and the spacer portion 77 in a linear direction, such as the lateral direction (i.e., in the +/−X direction). In other embodiments, the wire channel 76 is positioned anywhere within the housing segment 38 and may be linear, arcuate, and/or angled, or a combination thereof, to couple the cavity 46 to the wire receiving portion 58. It should be understood that the wire channel 76 may be configured to receive at least one wire 56, a bus bar, and the like.

A terminal connector 48 is positioned within the cavity 46 of each housing segment 38 of the plurality of housing segments 26. The terminal connector 48 generally includes an upper surface 50a and a lower surface 50b that define a thickness. In some embodiments, the terminal connector 48 is a substantially planar plate, or pair of plates, with respect to the floor 44 of each housing segment 38. As such, in this embodiment, the terminal connector 48 abuts the floor 44 within the cavity 46 of each housing segment 38. In other embodiments, the terminal connector 48 is arcuate or curvilinear with respect to the floor 44 of each housing segment 38. As such, in this embodiment, the terminal connector 48 abuts at least a portion of the floor 44 within the cavity 46 of each housing segment 38. The terminal connector 48 has a pair of openings 52 that communicatively couple the plurality of battery cells 24 to each terminal connector 48 and to the plurality of housing segments 26, as discussed in greater detail herein. The pair of openings 52 have a diameter D1. In some embodiments, each terminal connector 48 is a pair of plates, and each plate includes the pair of openings 52.

In some embodiments, each terminal connector 48 of each housing segment 38 of the plurality of housing segments 26 are a conductive metal material such as silver (Ag), copper (Cu), gold (Au), aluminum (Al), and the like. In other embodiments, each of the terminal connectors is a conductive material such as a beryllium (Be), calcium (Ca) magnesium (Mg), rhodium (Rh), sodium (Na), iridium (Ir), and the like.

In other embodiments, a portion of each terminal connector 48 of each housing segment 38 is conductive. In a non-limiting example, an annular ring portion 53 of the pair of openings 52 may be conductive while the remaining portions of each terminal connector 48 are insulated. In this example, the at least one wire 56 of a plurality of wires 54 is commutatively coupled to the conductive portion of the terminal connector 48, as discussed in greater detail herein. In other embodiments, the conductive portion of the terminal connector 48 may be a conductive path extending between a portion of the pair of openings 52 to a terminating position somewhere on the terminal connector 48.

It should be understood that in any embodiment, the at least one wire 56 is communicatively coupled to a conductive portion of the terminal connector 48 (i.e., the annular ring portion 53, the terminal connector 48 itself, and the like). As such, it should be understood that the at least one wire 56 may be positioned within the wire channel 76 such that a terminating portion 57 of the at least one wire 56 is communicatively coupled to the conductive portion of the terminal connector 48 (i.e., the annular ring portion 53, the terminal connector 48 itself, and the like). It should be appreciated that the terminating portion 57 of the at least one wire may be communicatively coupled to the conductive portion of the terminal connector 48 via lugs, terminals, solider, and the like.

In some embodiments, the wire receiving portion 58 of each housing segment 38 of the plurality of housing segments 26 extends from the terminating surface 79b of the spacer portion 77 in a direction away from each battery cell 24a of the plurality of battery cells 24. That is, the wire receiving portion 58 extends from the terminating surface 79b of the spacer portion 77 in the lateral direction (i.e., in the +/−X direction) to form a plurality of wires channel 74, which extends in the longitudinal direction (i.e., in the +/−Y direction) within the wire receiving portion 58 of the housing segment 38, as discussed in greater detail herein. The wire receiving portion 58 includes a cover portion 62 hingedly attached to the wire receiving portion 58 by a living hinge 60 such that the cover portion 62 moves from an open position to a closed position, in the direction indicated by arrow A2, as best seen in FIG. 3, and from the closed position to the open position in the direction indicated by arrow A3, as best seen in FIG. 4. That is, to move between the closed position to the open position, the cover portion 62 is rotated in the direction indicated by arrow A3, as best shown in FIG. 4. Further, it is understood that to move the cover portion 62 between the open position to the closed positon, the cover portion 62 is rotated in the direction indicted by arrow A2, as best shown in FIG. 3.

In some embodiments, the cover portion 62 is large enough to cover both the wire receiving portion 58 and the cavity 46 when the cover portion 62 is in the closed position. In other embodiments, the cover portion 62 covers the wire receiving portion 58 but not the cavity 46. In some embodiments, the cover portion 62 is coupled to the wire receiving portion 58 by the living hinge 60. In other embodiments, the cover portion 62 is coupled to the wire receiving portion 58 via a hinge assembly or the like.

Each cover portion 62 includes at least one clip 64 positioned at an upper edge 66a opposite of the hinge 60. In some embodiments, the upper edge 66a of the cover portion 62 may be linear. In other embodiments, the upper edge 66a of the cover portion 62 is arcuate. Further, in some embodiments, the at least one clip 64 may be a protrusion extending from an upper edge 66a of the cover portion 62 and corresponds to at least one clip receiver 70 that, in some embodiments, may be positioned on a lower edge 66b of the wire receiving portion 58. In other embodiments, the at least one clip receiver 70 is positioned on the upper surface 79a of the spacer portion 77 of the housing segment 38. In either embodiment, the at least one clip receiver 70 is a clip cavity 72 that receives the at least one clip 64 of the cover portion 62 when the cover portion 62 is in the closed position. It should be appreciated that the at least one clip 64 may be a resilient member that is releasable from the corresponding at least one clip receiver 70 such that the cover portion 62 is movable from the closed position to the open position. In other embodiments, the at least one clip 64 may be a female indentation that corresponds to at least one clip receiver that is positioned on the upper surface 41c and/or on the exterior surface 41b of the end wall 40a. In this embodiment, the at least one clip receiver is a protrusion that extends outwardly from the end wall 40a such that that the female indentation receives the protrusion of the at least one clip receiver 70 when the cover portion 62 is in the closed position.

Each wire receiving portion 58 of the plurality of housing segments 26 form the plurality of wires channel 74 that extends the length of the plurality of housing segments 26 in the C axis direction which extends in the longitudinal direction (i.e., in the +/−Y direction). That is, each wire receiving portion 58 of each housing segment 38 are connected such that the plurality of wires channel 74 is formed along the length of the plurality of housing segments 26 in the longitudinal direction (i.e., in the +/−Y direction). Each wire receiving portion 58 is configured to retain or house the plurality of wires 54 that extend generally in the C axis direction. The plurality of wires 54 are communicatively coupled to the plurality of battery cells 24 such that an energy stored within the plurality of battery cells 24 may be transferred from the plurality of battery cells 24 to another component of the vehicle 10 and/or an energy may be transferred to the plurality of battery cells 24 via the plurality of wires 54. It should be understood that the energy stored and/or transferred may be a voltage, a current, a power, and the like. It should be appreciated that the plurality of wires 54 may be a bus bar, a wire, a circuit board, and/or other conductive medium that transfers the energy stored within the plurality of battery cells 24 to the components of the vehicle 10 and/or receives energy to be transferred to the plurality of battery cells 24. In some embodiments, the component of the vehicle 10 may be a powertrain component. In other embodiments, the vehicle component is an inverter, a relay, fuses, other electrical components, and the like.

Now referring to FIGS. 1-5, in some embodiments, the cover portion 62 and the wire receiving portion 58 are each semicircular such that in the closed positon, the cover portion 62 and wire receiving portion 58 of each housing segment 38 form a tube 80. Each tube 80 of each housing segment 38 of the plurality of housing segments 26 are configured to be releasably coupled to an adjacent housing segment 38*a*. That is, in some embodiments, the cover portion 62 and wire receiving portion 58 each include a proximate end 82*a*, 82*b* respectively, and a distal end 83*a*, 83*b*, respectively, with reference to the end retaining walls 28 of the housing 22. A tube attachment 84*a*, 84*b* is positioned on each distal end 83*a*, 83*b* of the cover portion 62 and the wire receiving portion 58 respectively. Further, a tube retainer 86*a*, 86*b* is positioned on each proximate end 82*a*, 82*b* of the cover portion 62 and the wire receiving portion 58 respectively. In some embodiments, the tube retainer 86*a*, 86*b* is a semi-annular grove extending a diameter of the tube 80 such that in the closed position, the tube retainer 86*a*, 86*b* may form a complete, or 360-degree annular groove. In some embodiments, the tube attachment 84*a*, 84*b* is a resilient member that has a pair of notches or recesses 88 and a tab member 89 positioned between the pair of recesses 88. A protrusion 87 extends from an exterior surface of the tab member 89. As such, the protrusion 87 of the tab member 89 is received within the annular groove of the tube retainer 86*a*, 86*b* of the housing segment 38 and adjacent housing segments 38*a*, 38*b*. Once the protrusion 87 and tab member 89 are received within the annular groove of the tube retainer 86*a*, 86*b* the housing segment 38 the adjacent housing segment 38*a* are releasably coupled. In some embodiments, the protrusion 87 of the tab member 89 is received within the annular groove of the tube retainer 86*a*, 86*b* as a snap tab arrangement. In other embodiments, the protrusion 87 of the tab member 89 is received within the annular groove of the tube retainer 86*a*, 86*b* in other arrangements such as a hook and loop arrangement and the like.

Figure 5:
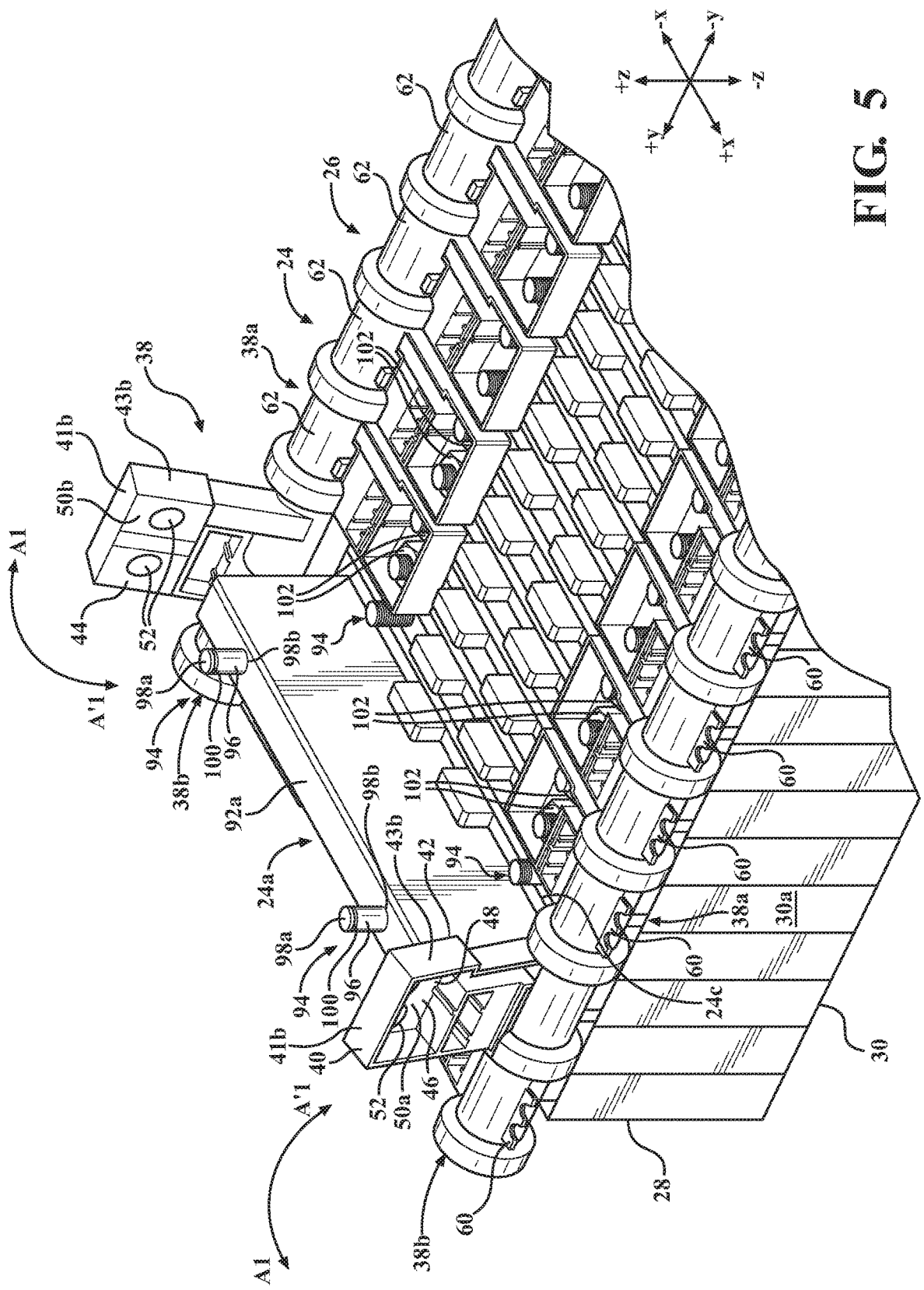
FIG. 5 schematically depicts a partial isolated perspective view of the plurality of housing segments of the battery pack assembly of FIG. 1 in a maintenance position and use position, according to one or more embodiments shown or described herein.

Each housing segment 38 of the plurality of housing segments 26 are configured to be pivotally moved between a use position and a maintenance position about an axis C in the direction as indicated by arrow A1, as best shown in FIG. 5, and back into the use positon, as indicated by the arrow A'1 as best shown in FIG. 5. That is, each housing segment 38 of the plurality of housing segments 26 are configured to be moved, pivoted, or rotated, from the use position to the maintenance position along the axis C in the direction as indicated by arrow A1 in FIG. 5. Further, each housing segment 38 of the plurality of housing segments 26 are configured to be moved, or rotated, from the maintenance position to the use position along the axis C in the direction as indicated by arrow A'1 in FIG. 5. As such, it should be appreciated that each housing segment 38 of the plurality of housing segments 26 are configured to move independently between the use position and the maintenance position. That is, each housing segment 38 of the plurality of housing segments 26 are independently movably, or rotatably pivoted without the need to move adjacent housing segments 38*a*.

It should be understood that, in some embodiments, the use position is where the housing segment 38 is positioned in a horizontal position across the terminal surface 92*a* of each battery cell of the plurality of battery cells 24. That is, in the use position, the exterior surface 41*b* of the end wall 40*a* of each housing segment 38 of the plurality of housing segments 26 faces the housing interior portion 32 and the terminating surface 79*b* of the spacer portion 77 of the each housing segment 38 of the plurality of housing segments 26 faces in a direction towards the opposite of the housing interior portion 32, towards the one of the pair of side retaining walls 30.

As such, in the use position, in some embodiments, the plurality of terminals 94 are received by the pair of openings 52 of the terminal connector 48 such that the pair of terminals 94 are engaged with the pair of openings 52. That is, the pair of openings 52 of each terminal connector 48 receives a portion of the plurality of terminals 94 such that a portion of the plurality of terminals 94 makes contact, or are engaged with, the pair of openings 52 of each terminal connector 48. As such, in the use position, the plurality of terminals 94 communicatively coupled to the terminal connector 48 of the housing segment 38 such that each terminal connector 48 of each housing segment 38 provides a conductive medium such that an energy stored in of each of the plurality of battery cells 24 may be carried through the terminal connector 48 and the at least one wire 56 of each housing segment 38 of the plurality of housing segments 26 and/or an energy may be transmitted to each of the plurality of battery cells 24 via the at least one wire 56 and the terminal connector 48 of each housing segment 38 of the plurality of housing segments 26, as discussed in greater detail herein.

As such, it should be understood that in the use position, each housing segment 38 of the plurality of housing segments 26 assist in retaining the plurality of battery cells 24 within the housing 22. It should be appreciated that each housing segment 38 of the plurality of housing segments 26 prevent access to the plurality of battery cells 24 when each housing segment 38 of the plurality of housing segments 26 are in the use position. Further, it should be understood that in the use position, the fastener 102 retains the electrical connection between the terminal connector 48 and the terminal of the pair of terminals 94. That is, the fastener 102, when coupled to the terminal of the pair of terminals, inhibits movement of the housing segment 38 of the plurality of housing segments 26 between the use position and the maintenance position. As such, the fastener 102 may assist the housing segment 38 in retaining the battery cell 24*a* and may inhibit movement of the battery cell 24*a* in the withdrawal direction.

Further, it should be understood that, in some embodiments, the maintenance position is where the housing segment 38 is rotated, about the axis C, in the direction of arrow A1, to a generally vertical position such that access to the battery cell 24*a* of the plurality of battery cells 24 is now accessible and the housing segment 38, while still coupled to the other adjacent housing segments 38a, 36b, is moved to a position out of the way such that the battery cell 24a can be removed from the battery pack assembly 20. That is, in the maintenance position, access to each battery cell of the plurality of battery cells 24 is permitted such that at least one battery cell 24a of the plurality of battery cells 24 may be removed from the housing 22 in the withdrawal direction. As such, to move the housing segment 38 from the use position to the maintenance positon, it should be appreciated that the fastener 102 is removed from each pair of terminals 94 within the housing segment 38. Once the fastener 101 is removed, the housing segment 38 is moved and the plurality of terminals 94 are disengaged with the pair of openings 52 of the terminal connector 48 of the housing segment 38 to electrically interrupt or electrically disconnect the plurality of terminals 94 from the housing segment 38. Once electrically disconnected, or the plurality of terminals 94 are disconnected from the pair of openings 52, a corresponding battery cell 24a of the plurality of battery cells 24 may be removed from the battery pack assembly 20 in a withdrawal direction.

In embodiments, to move between the use position and the maintenance position, the tab member 89 and the protrusion 87 of housing segment 38 are rotated within the annular groove of the tube retainer 86a, 86b of the adjacent housing segment 38a such that the housing segment 38 and the adjacent housing segment 38a remain coupled but the housing segment 38 is individually moved from the use position to the maintenance position. As such, in the maintenance position, the housing segment 38 is positioned such that the battery cell 24a may be removed from the battery pack assembly 20.

Referring to FIGS. 2-4 and FIG. 9, in some embodiments, opposing terminal connectors 48 of the housing segment 38 are paired. In this embodiment, each terminal connector 48 are positioned such that both terminals of the battery cell 24a and the adjacent battery cell 24c are coupled to the terminal connector 48 of the housing segment 38. As such, the terminal connector 48 is positioned to correspond to the pair of terminals 94 of both the battery cell 24a and the adjacent battery cell 24c of the plurality of battery cells 24 when each housing segment 38 is in the use position. That is, one terminal connector 48 is configured to communicatively couple a positive polarity terminal from the battery cell 24a of the plurality of battery cells 24 and to a negative polarity terminal of the adjacent battery cell 24c of the plurality of battery cells 24. The opposing corresponding terminal connector 48 is configured to communicatively couple a positive polarity terminal from the adjacent battery cell 24c of the plurality of battery cells 24 and to a negative polarity terminal of the battery cell 24a. It should be understood that this pattern continues throughout the plurality of battery cells 24 such that each battery cell of the plurality of battery cells are arranged in a series configuration.

In other embodiments, one terminal connector 48 is configured to communicatively couple the negative polarity terminal from the battery cell 24a of the plurality of battery cells 24 to the positive polarity terminal of the adjacent battery cell 24c of the plurality of battery cells 24. The other corresponding terminal connector 48 is configured to communicatively couple the positive polarity terminal from the adjacent battery cell 24c of the plurality of battery cells 24 to the negative polarity terminal of the battery cell 24a of the plurality of battery cells 24.

As such, it is understood that the terminal connector 48 of the housing segment 38 and the adjacent housing segment 38a along with the at least one wire 56 complete or close an electrical circuit between the battery cell 24a and adjacent battery cells 24b, 24c of the plurality of battery cells 24 when the housing segment 38 of the plurality of housing segments 26 is in the use position. As such, the terminal connector 48 of the housing segment 38 and the adjacent housing segment 38a along with each at least one wire 56 of the plurality of wires 54 daisy chain, or electrically position the plurality of battery cells 24 into a series configuration when the housing segment 38 of the plurality of housing segments 26 is in the use position. That is, the terminal connector 48 of a housing segment 38 and at least one wire 56 together electrically position the plurality of battery cells 24 into a series configuration such that the energy stored in or received by each of the plurality of battery cells 24 is maximized for transfer to other components of the vehicle 10 or for recharging.

Figure 6:
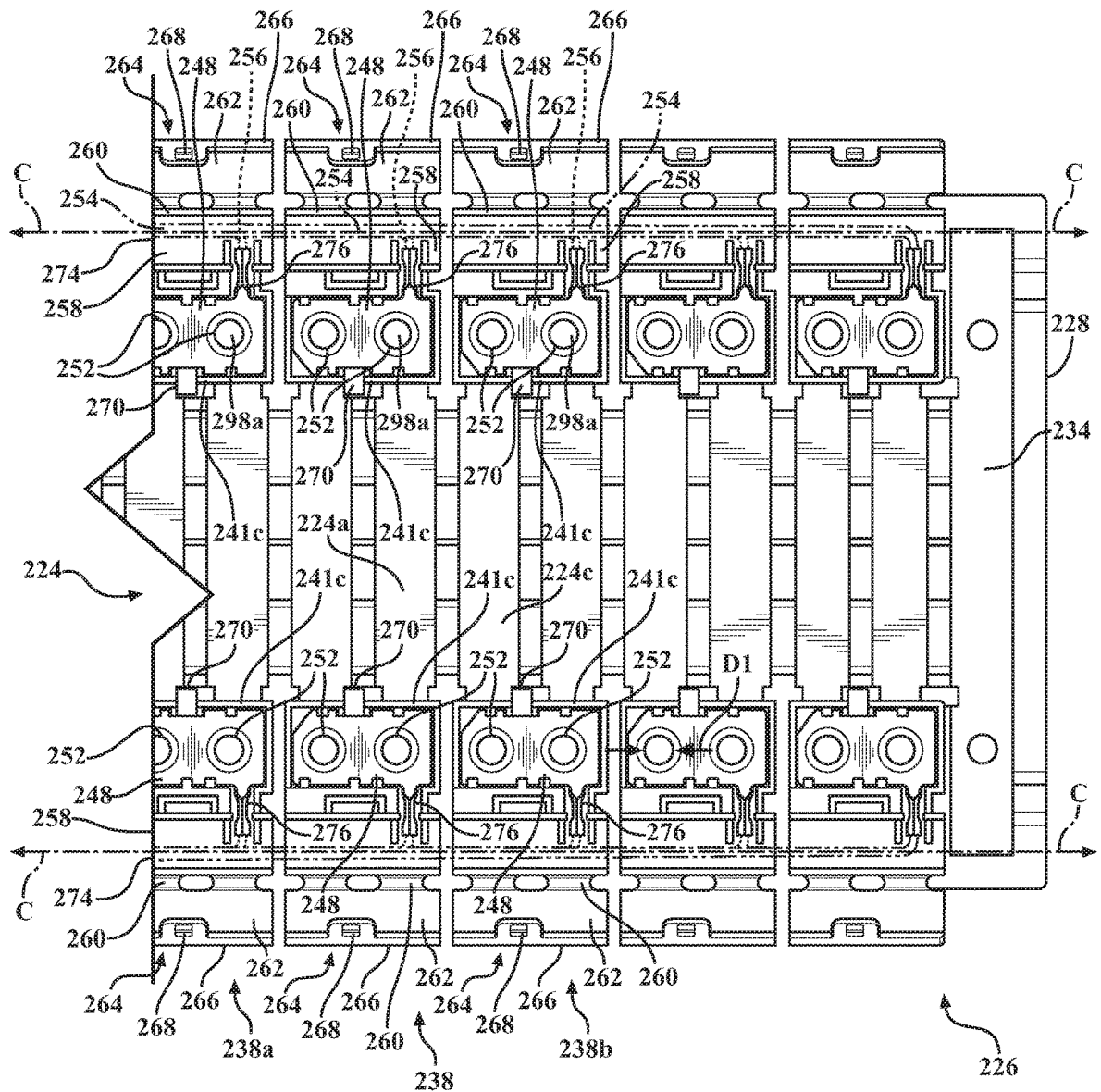
FIG. 6 schematically depicts a partial top view of a second aspect of a plurality of housing segments of the battery pack assembly of FIG. 1 in a use position, according to one or more embodiments described herein.
Figure 7A:
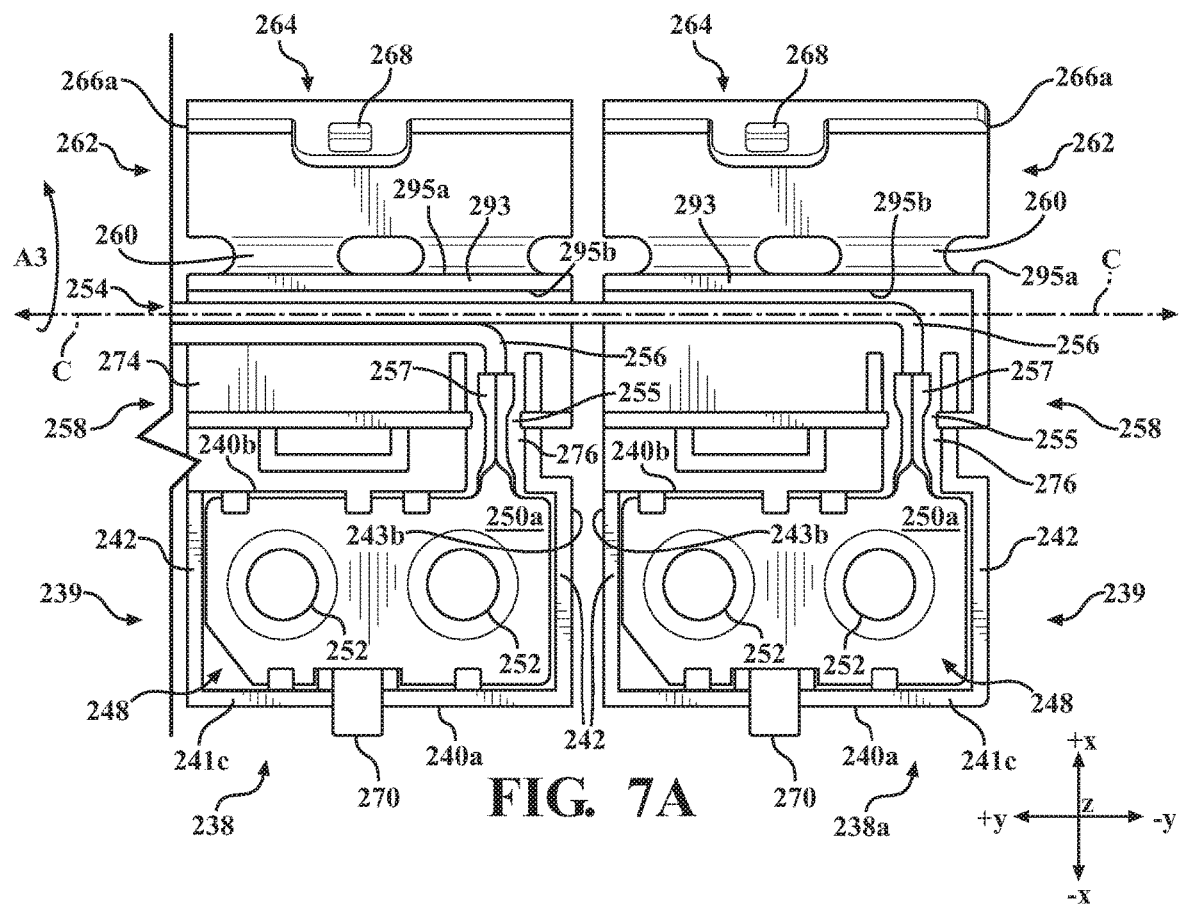
FIG. 7A schematically depicts a partial isolated perspective view of the plurality of housing segments of the battery pack assembly of FIG. 6 in an open position, according to one or more embodiments shown or described herein.
Figure 7B:
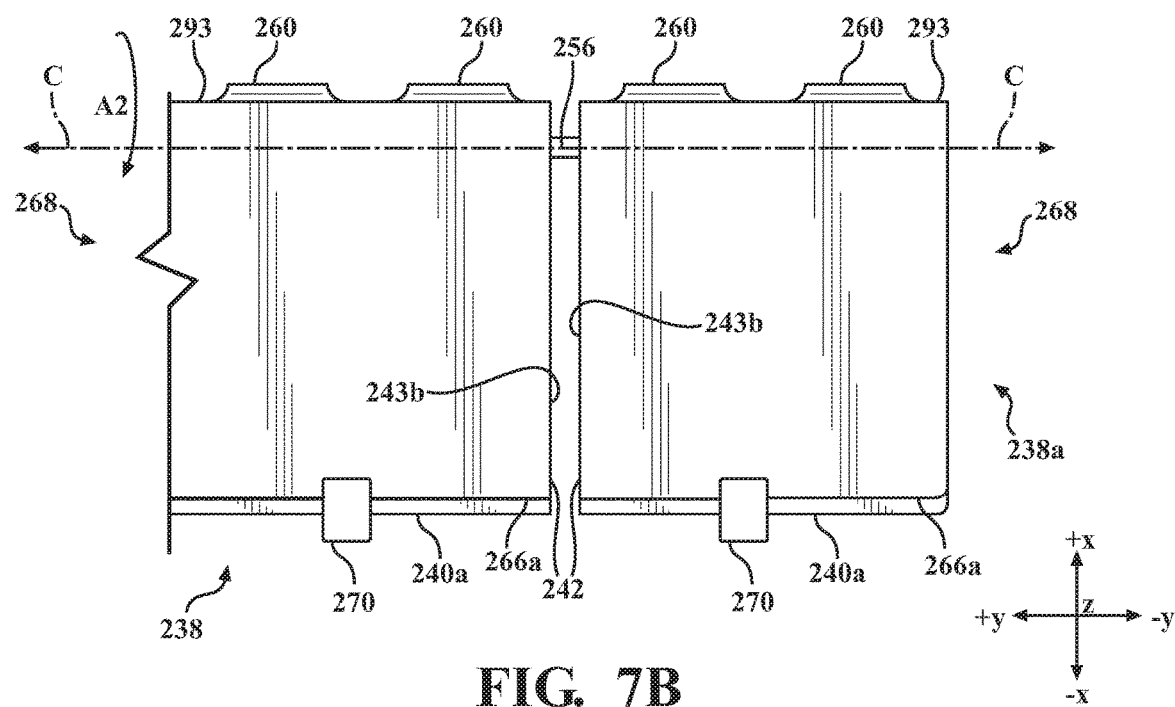
FIG. 7B schematically depicts a partial isolated perspective view of the plurality of housing segments of the battery pack assembly of FIG. 6 in a closed position, according to one or more embodiments shown or described herein.
Figure 8:
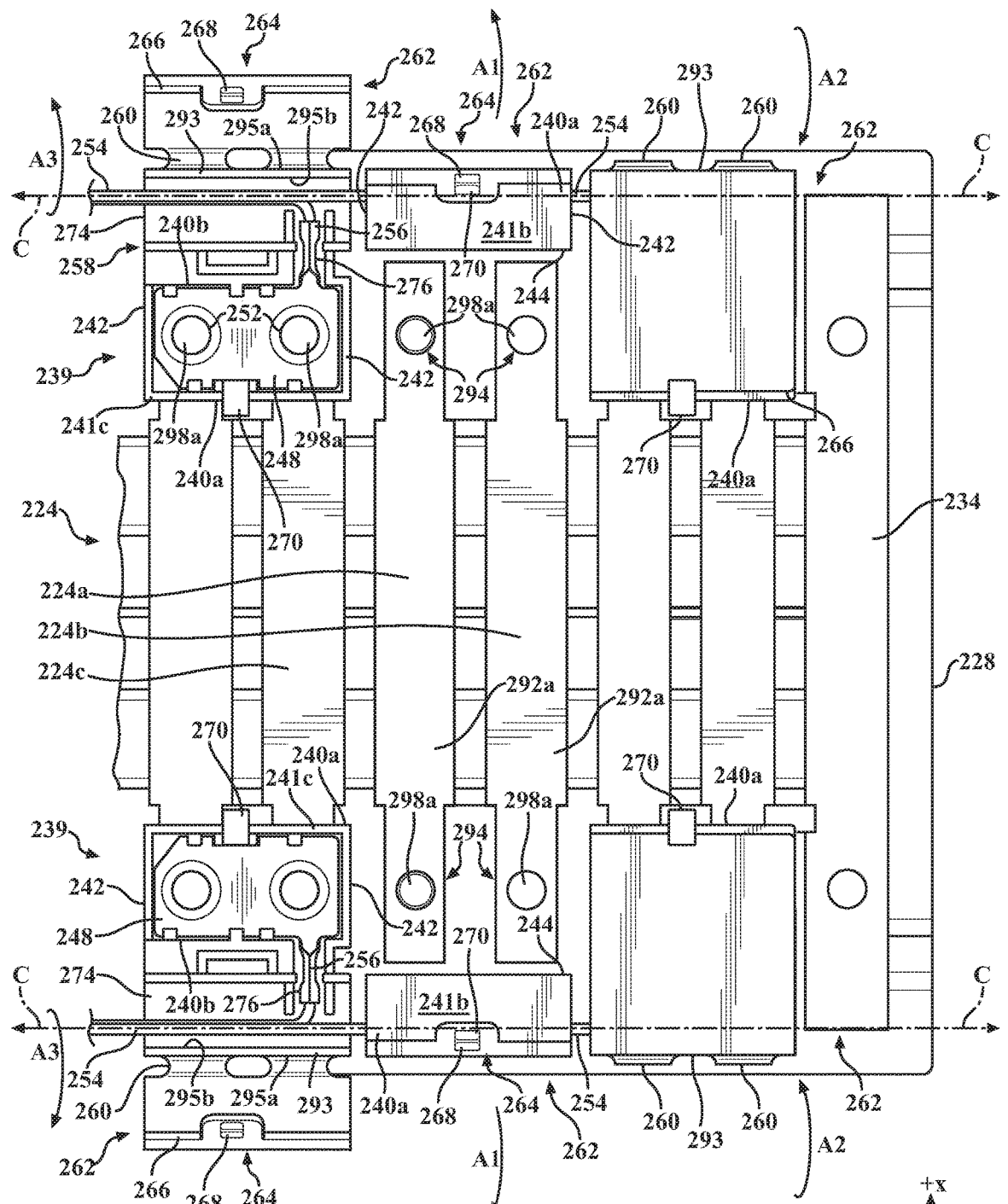
FIG. 8 schematically depicts a partial isolated perspective view of the plurality of housing segments of the battery pack assembly of FIG. 6 in the open position, a maintenance position, and a closed position, according to one or more embodiments shown or described herein.

Now referring to FIGS. 6-8, a second aspect of a plurality of housing segments 226 is schematically depicted. It is understood that the plurality of housing segments 226 is similar to the plurality of housing segments 26 with the exceptions of the features described herein. As such, like features will use the same reference numerals with a prefix "2" for the reference numbers. As such, for brevity reasons, these features will not be described again.

The pair of sidewalls 242 of each housing segment 238 extends the length of housing segment 238 in the lateral direction (i.e., in the +/−X direction) and the end walls 240a, 240b extend a width of the housing segment 238 in the longitudinal direction (i.e., in the +/−Y direction). Further, the end wall 240b of each housing segment 38 may include a notch 255 that forms a portion of the wire channel 276 extending between the cavity 246 and the wire receiving portion 258. As such, the at least one wire 256 extends through the notch 255 and s received in the cavity 246 such that the terminating portion 257 of the at least one wire 256 is commutatively coupled to the terminal connector 248.

The wire receiving portion 258 is formed between the end wall 240b and a wire receiving end wall 293. It should be appreciated that the wire receiving end wall 293 includes an exterior surface 295a and an interior surface 295b. In some embodiments, the cover portion 262 is large enough to cover both the wire receiving portion 258 and the cavity 246 when the cover portion 262 is in the closed position, as best seen in FIG. 7B. In other embodiments, the cover portion 262 covers the wire receiving portion 258 but not the cavity 246. It should be appreciated that, in the closed position, access to the terminal connector 248 is inhibited by the cover portion 262. As such, in the closed positon, access to the terminals 94 of the plurality of battery cells 24 is also inhibited.

Each cover portion 262 includes at least one clip 264 positioned at an upper edge 266a opposite of the hinge 260. In some embodiments, the upper edge 266a of the cover portion 262 may be linear. In other embodiments, the upper edge 266a of the cover portion 262 is arcuate. In some embodiments, the at least one clip 264 may be a female indentation 268 that corresponds to at least one clip receiver 270 positioned on the upper surface 241c of the end wall 240a of the housing segment 238. In this embodiment, the at least one clip receiver 270 is a protrusion that extends outwardly from the end wall 240a such that that the female indentation 268 receives the protrusion of the at least one clip receiver 270 when the cover portion 262 is in the closed position. In other embodiments, the at least one clip receiver 270 is a cavity that receives the at least one clip 264 of the cover portion 262 when the cover portion 262 is in the closed position. It should be appreciated that in either embodiment, the at least one clip 264 may be a resilient member that is releasable from the corresponding at least one clip receiver 270 such that the cover portion 262 is movable between the closed position to the open position.

Each housing segment 238 of the plurality of housing segments 226 are only coupled to an adjacent housing segment 238a by the at least one wire 256 of that particular housing segment 238 and/or the plurality of wires 254 passing through the plurality of wires channel 274 of each wire receiving portion 258 of each housing segment 238 of the plurality of housing segments 226. As such, the at least one wire 256 and/or the plurality of wires 254 extend between exterior surface 243b of each sidewalls 242 of the housing segment 238 at the wire receiving portion 258. It should be appreciated that the at least one wire 256 and/or the plurality of wires 254 may act as a resilient member that may connect each housing segment 238 together but does not interfere with each individual housing segment 238 of the plurality of housing segments 226 pivoting or moving between the use position, as best seen in FIG. 6 and the maintenance position, as best seen in FIG. 8, and as discussed in greater detail herein. That is, each housing segment 238 of the plurality of housing segments 226 are only coupled to an adjacent housing segment 238a by the at least one wire 256 and/or the plurality of wires 254 and are not coupled by any portion of the housing segment 238 itself.

As such, each wire receiving portion 258 of the plurality of housing segments 226 form the plurality of wires channel 274 that extends the length of the plurality of housing segments 226 in the C axis direction, which extends in the longitudinal direction (i.e., in the +/−Y direction). It should be appreciated that the plurality of wires channel 274 are intermittent, or separated between each housing segment 38. That is, each wire receiving portion 258 of each housing segment 38 are not connected but are positioned to form the plurality of wires channel 274 along the length of the plurality of housing segments 26 in the longitudinal direction (i.e., in the +/−Y direction). As such, the plurality of wires 54 extend generally in the C axis direction between each housing segment 238. Further, in some embodiments, as discussed herein, the plurality of wires 254 are exposed in between the housing segment 238 and the adjacent housing segment 238a and may assist in moving the housing segment 238 between the use position and the maintenance position.

It should be understood that, in some embodiments, the use position is where the housing segment 238 is positioned in a horizontal position across the terminal surface 292a of each battery cell of the plurality of battery cells 224. That is, in the use position, the exterior surface 241b of the end wall 240a of each housing segment 238 of the plurality of housing segments 226 faces the housing interior portion 232 and the exterior surface 295a of the wire receiving end wall 293 of each housing segment 238 of the plurality of housing segments 26 faces in a direction towards the opposite of the housing interior portion 232, towards the one of the pair of side retaining walls 230.

In some embodiments, the maintenance position is where the housing segment 238 is rotated, about the axis C, in the direction of arrow A1, to a generally vertical position where the exterior surface 241b of the end wall 240a is generally facing in a direction away from the floor 234 of the battery pack assembly 220 and the exterior surface 295a of the wire receiving end wall 293 is generally facing the floor 234 of the battery pack assembly 220. As such, access to the battery cell 224a of the plurality of battery cells 224 is now accessible and the housing segment 238, while still coupled to the other adjacent housing segments 238a, 238b via the at least one wire 256 and/or the plurality of wires 254, is moved to a position out of the way such that the battery cell 224a can be removed from the battery pack assembly 220.

Figure 10:
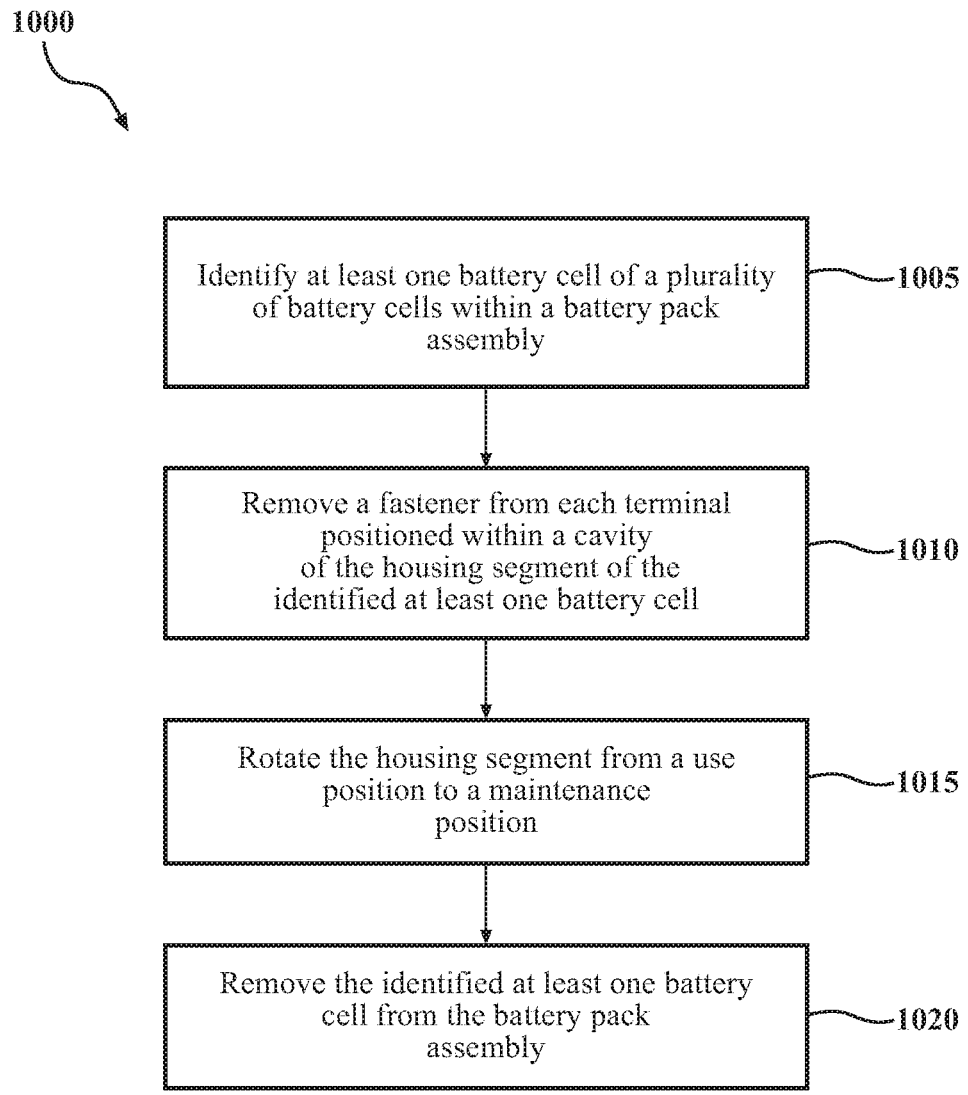
FIG. 10 schematically depicts a flowchart of an illustrative method of removing the battery cell from the battery pack assembly of FIG. 1, according to one or more embodiments described herein.

Now referring to FIG. 10, a flowchart of an illustrative method 1000 of removing the battery cell 24a from the battery pack assembly 20 of FIG. 1 is depicted. At block 1005, at least one battery cell 24a of the plurality of battery cells 24 is identified for removal. At block 1010, each fastener 102 of the at least one identified battery cell 24a and adjacent battery cell 24c within the cavity 46 of the housing segment 38 is removed from the distal end 98a of the pair of terminals 94 of the at least one identified battery cell 24a and the adjacent battery cell 24c. Once the fastener 102 is removed, at block 1015, the housing segment 38 of the at least one identified battery cell 24a is rotated from the use position into the maintenance position, thereby providing access to the at least one identified battery cell 24a. It should be understood that the embodiments described herein permit for access to the at least one identified battery cell 24a without removing all of the fasteners 102 from the plurality of terminals 94 of all of the plurality of battery cells 24. Further, it should be appreciated that the at least one wire 56, the plurality of wires 54, temperature sensors, and the like, may remain in the cover portion 62 during rotation of each housing segment 38 between the use position and the maintenance position. At block 1020, the at least one identified battery cell 24a of the plurality of battery cells 24 is removed from the battery pack assembly 20.

Figure 11:
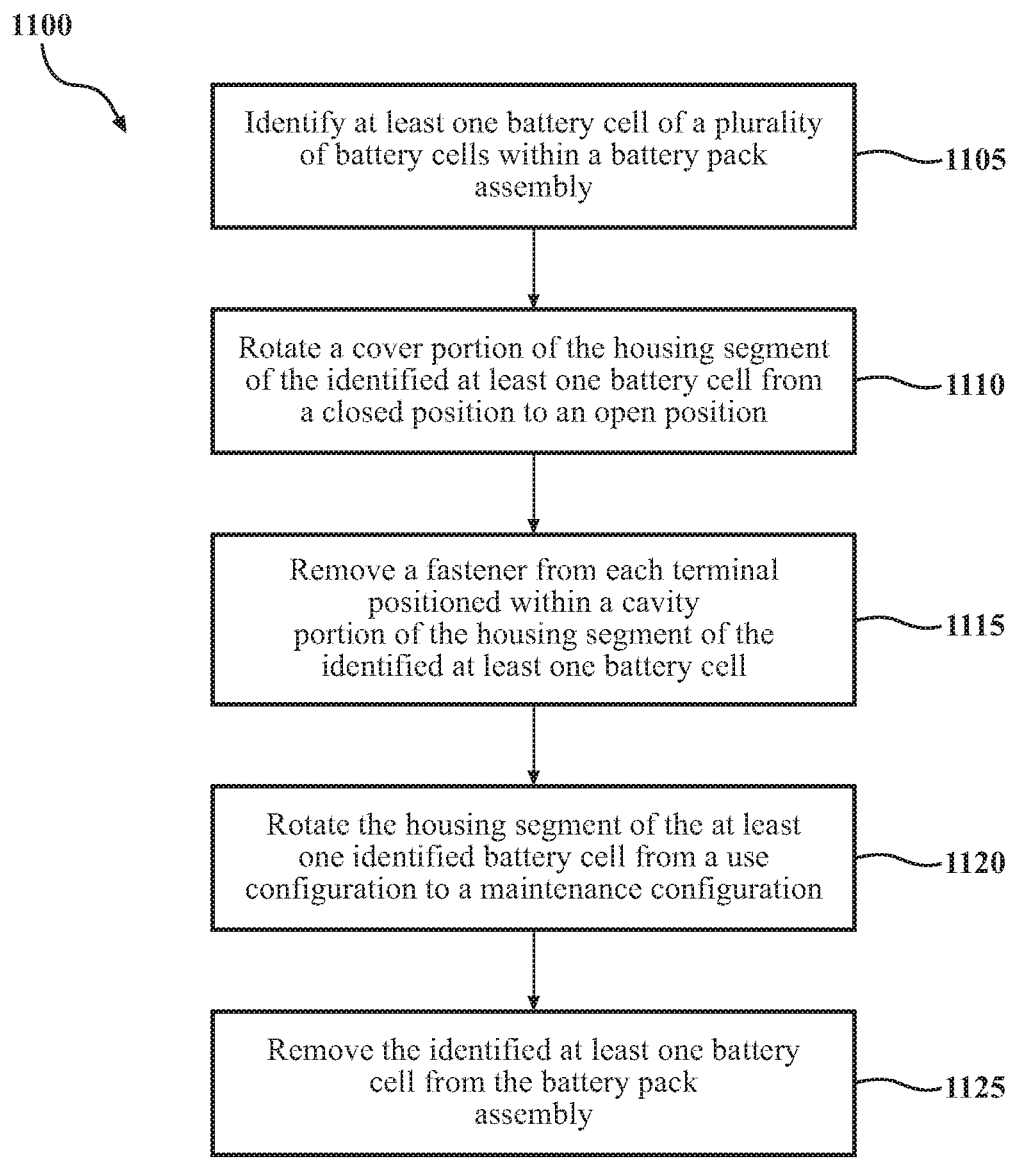
FIG. 11 schematically depicts a flowchart of an illustrative method of removing the battery cell from the battery pack assembly of FIG. 6, according to one or more embodiments described herein.

Now referring to FIG. 11, a flowchart of an illustrative method 1100 of removing the battery cell 224a from the battery pack assembly 220 of FIGS. 6-8 is depicted. At block 1105, at least one battery cell 224a of the plurality of battery cells 224 is identified for removal from the battery pack assembly 220. At block 1110, the cover portion 262 of the housing segment 238 of the at least one identified battery cell 224a is rotated from the closed position to the open position. At block 1115, each fastener 102 within the cavity 246 of the housing segment 238 of the at least one identified battery cell 224a and the adjacent battery cell 224b is removed from the terminals 94 of the at least one identified battery cell 224a and the adjacent battery cell 224c.

Once the fastener 102 is removed, at block 1120, the housing segment 238 of the at least one identified battery cell 224a is rotated from the use position into the maintenance position, thereby providing access to the at least one identified battery cell 224a. It should be understood that the housing segment 238 is rotated about the plurality of wires 254, which maintains the coupling of the housing segment 238 of the at least one identified battery cell 224a to the adjacent housing segments 238a. It should also be understood that the embodiments described herein permit access to the at least one identified battery cell 224a without removing all of the fasteners 102 from the plurality of terminals 294 of the remaining battery cells of the plurality of battery cells 224. Further, it should be appreciated that the plurality of wires 254, temperature sensors, and the like, may remain in the wire receiving portion 258 while still allowing for rotation of the housing segment 238 between the use position and the maintenance position. At block 1125, the identified battery cell 224a of the plurality of battery cells 224 is removed from the battery pack assembly 220.

The above described battery pack assembly provides for simplifying the removal of battery cells of a plurality of battery cells to reduce the time and effort required to replace at least one individual battery cell. The battery assembly includes a plurality of housing segments that are individually moveable between a use position and a maintenance position. In the use position, the plurality of housing segments are communicatively coupled to the plurality of battery cells such that the energy stored within the plurality of battery cells may be transmitted from the plurality of battery cells to a plurality of vehicle components and vice versa. Further, in the use position, the plurality of housing segments assist in retaining the plurality of battery cells within a housing of the battery pack assembly. In the maintenance position, access to individual battery cells is provided such that one or more battery cells of the plurality of battery cells may be removed from the battery pack assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
a plurality of housing segments coupled to one another, each one of the plurality of housing segments includes:
a terminal receiving portion having a pair of end walls, a pair of side walls and a floor;
a terminal connector positioned within the terminal receiving portion, the terminal connector having a pair of openings;
a plurality of battery cells each having a pair of terminals that are received within the pair of openings,
wherein each one of the plurality of housing segments are configured to be rotated with respect to an adjacent housing segment between a use position and a maintenance position thereby permitting access to at least one battery cell of the plurality of battery cells.

2. The battery pack assembly of claim 1, wherein in the use position, the pair of terminals are received by the pair of openings of the terminal connector such that the pair of terminals are engaged the terminal connector and the pair of terminals are communicatively coupled to the terminal connector.

3. The battery pack assembly of claim 2, wherein in the maintenance position, the pair of terminals are disengaged from the pair of openings of the terminal connector.

4. The battery pack assembly of claim 3, wherein in the maintenance position, a selected battery cell of the plurality of battery cells is removed from the battery pack assembly.

5. The battery pack assembly of claim 2, wherein each one of the plurality of housing segments further includes:
a flexible elongated member receiving portion having a cover portion hingedly attached to the flexible elongated member receiving portion to move between an open position and a closed position, the cover portion includes a clip and the flexible elongated member receiving portion includes a corresponding clip receiver such that the clip is received in the clip receiver in the closed position.

6. The battery pack assembly of claim 2, wherein each one of the plurality of housing segments further comprising:
a tube portion, the tube portion having a first half and a second half hingedly attached to the first half such that the second half moves between a closed position and an open position, the first half is coupled to the terminal receiving portion, the second half includes a clip, the first half includes a clip receiver such that the clip of the second half is received by the clip receiver of the first half to form a cylindrical shape of the tube portion when the second half in the closed position.

7. The battery pack assembly of claim 6, wherein:
the first and second half each include a proximate end and an opposite distal end,
the distal end includes a tube attachment portion, the proximate end includes a tube retainer portion.

8. The battery pack assembly of claim 7, wherein the tube attachment portion of the housing segment is received in the tube retainer portion of the adjacent housing segment to couple the adjacent housing segment to the housing segment of the plurality of housing segments when the second half of the tube portion is in the closed position.

9. The battery pack assembly of claim 8, wherein in the maintenance position, the tube attachment portion of the housing segment is rotated with the tube retainer portion of the adjacent housing segment of the plurality of housing segments such that the housing segment of the plurality of housing segments is individually moved from the use position to the maintenance position.

10. The battery pack assembly of claim 9, wherein a plurality of flexible elongated members are housed in the tube portion.

11. A battery pack assembly comprising:
a plurality of housing segments, each one of the plurality of housing segments comprising:
a terminal receiving portion; and
a tube portion, the tube portion having a first half and a second half hingedly attached to the first half such that the second half moves between a closed position and an open position, the first half is coupled to the terminal receiving portion, the first and second halves each include a tube attachment portion that is received a tube retainer portion of an adjacent housing segment,
wherein the housing segment is coupled to the adjacent housing segment of the plurality of housing segments when the tube attachment portion of the housing segment is received in the tube retainer portion of the adjacent housing segment and the second half of the tube portion is in the closed position.

12. The battery pack assembly of claim 11, wherein each one of the plurality of housing segments are configured to be rotated with respect to the adjacent housing segment about an axis that extends through the tube portion between a use position and a maintenance position.

13. The battery pack assembly of claim 12, wherein the coupling of the adjacent housing segment to the housing segment is by a snap tab engagement.

14. The battery pack assembly of claim 12, wherein in the maintenance position, the tube attachment portion of the housing segment is rotatably engaged within the tube retainer portion of the adjacent housing segment of the plurality of housing segments such that the housing segment of the plurality of housing segments is individually moved from the use position to the maintenance position.

15. The battery pack assembly of claim 14, wherein the terminal receiving portion includes a terminal connector having a pair of openings and is communicatively coupled to at least one flexible elongated member.

16. The battery pack assembly of claim 15, further comprising:
a plurality of battery cells, each battery cell of the plurality of battery cells having a terminal side, a pair of terminals are positioned on the terminal side of each of the plurality of battery cells.

17. The battery pack assembly of claim 16, wherein in the use position, the pair of terminals are received within the pair of openings of the terminal connector such that the pair of terminals engage with the pair of openings to communicatively couple to the pair of terminals of the battery cell to the terminal connector of the housing segment.

18. The battery pack assembly of claim 16, wherein in the maintenance position, the pair of terminals are disengaged from the terminal connector of the terminal receiving portion of the housing segment.

* * * * *

UNITED STATES PATENT AND TRADEMARK OFFICE
CERTIFICATE OF CORRECTION

PATENT NO. : 11,509,010 B2
APPLICATION NO. : 16/778720
DATED : November 22, 2022
INVENTOR(S) : Jordan S. Guttrich et al.

It is certified that error appears in the above-identified patent and that said Letters Patent is hereby corrected as shown below:

In the Specification

In Column 8, Line(s) 19, delete "positon" and insert --position--, therefor.

In Column 9, Line(s) 21, delete "positon" and insert --position--, therefor.

In Column 9, Line(s) 61, delete "positon" and insert --position--, therefor.

In Column 11, Line(s) 9, delete "positon" and insert --position--, therefor.

In Column 12, Line(s) 48, delete "positon" and insert --position--, therefor.

Signed and Sealed this
Twenty-eighth Day of November, 2023

Katherine Kelly Vidal
*Director of the United States Patent and Trademark Office*